Nov. 15, 1927.
G. G. BECKHARDT
1,649,652
DISPLAY APPARATUS
Filed Aug. 16, 1926
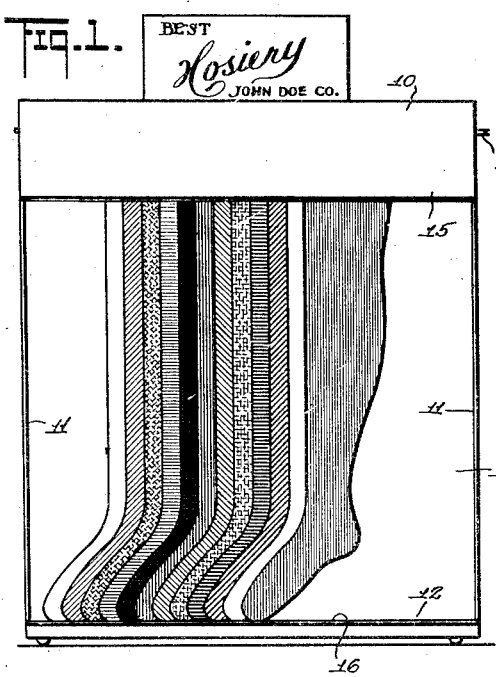
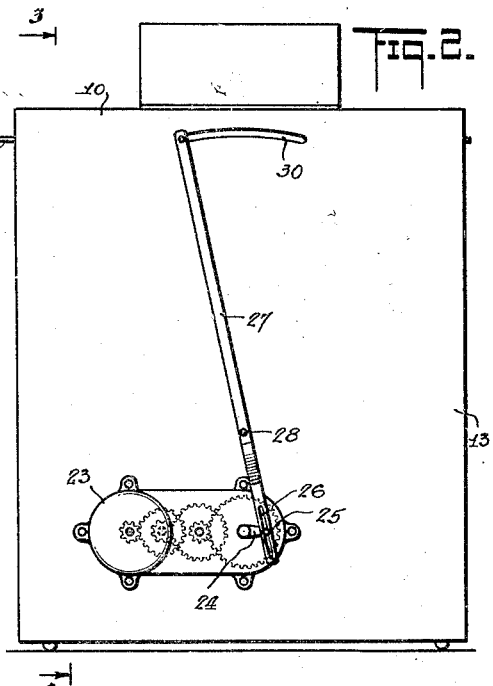
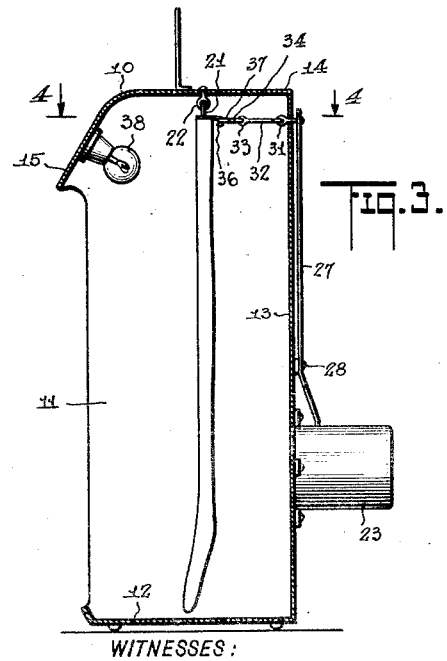
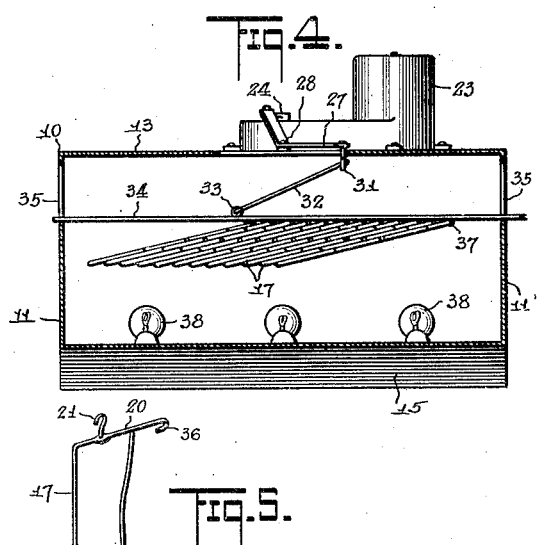
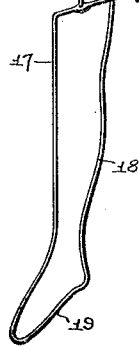
WITNESSES:
INVENTOR
Gene Gardner Beckhardt
BY Munn & Co.
ATTORNEYS Patented Nov. 15, 1927.

1,649,652

UNITED STATES PATENT OFFICE.

GENE GARDNER BECKHARDT, OF BROOKLYN, NEW YORK.

DISPLAY APPARATUS.

Application filed August 16, 1926. Serial No. 129,523.

This invention relates to display apparatus, and has particular reference to apparatuses for displaying hosiery.

The principal object of the present invention is the provision of a display apparatus in which an assortment of hosiery of different colors may be displayed to the gaze of customers or prospective customers who may select the desired color by comparison with the colors of the other hose, without necessitating handling, thus obviating soiling of the hose; so as to reduce costs and to save time in negotiating sales; and so as to keep the hosiery neat and attractive.

Another object of the invention is the provision of a display apparatus of the indicated character in which the hosiery will be kept in motion so as to attract attention and thereby induce or encourage sales.

Another object of the invention is the provision of a display apparatus of the indicated character with means for illuminating the hosiery.

The nature of the invention and its distinguishing features and advantages will appear when the following specification is read in connection with the accompanying drawing, in which—

Figure 1 is a front view of the apparatus showing the hosiery displayed in accordance with the present invention.

Fig. 2 is a rear view of the apparatus.

Fig. 3 is a sectional view on the line 3—3 of Fig. 2.

Fig. 4 is a sectional view taken on the line 4—4 of Fig. 3.

Fig. 5 is a perspective view of one of the supporting frames.

Generally stated, the apparatus of the present invention will include a plurality of supporting frames each of which is adapted to have arranged thereon a stocking, and each of which is shaped to conform to the leg and foot section of the stocking so as to hold the same stretched. All of the frames and their stockings are supported for turning movement and will lie side by side in overlapped relationship so that the different colors of the stockings will appear in contrast. Means is provided for effecting the turning movement of the frames simultaneously in opposite directions so as to attract attention. The supporting frames and the stockings will be arranged within a suitable casing open at the front so that the stockings will be visible in contrast to a suitable background provided by the rear wall of the casing. The apparatus will also include means for illuminating the stocking supported by the frames so that the stockings can be effectively displayed at night in any show window.

Referring now more particularly to the drawing, it will be apparent that, there is shown a casing 10 of any preferred size and proportion. The said casing 10 has side walls 11, bottom wall 12, rear wall 13, and a top wall having a substantially horizontal portion 14 and an angularly disposed portion 15 at the front of the casing. The casing 10 thus constructed will be provided with a front opening 16. Suspended from the horizontal portion 14 are a plurality of supporting frames 17 of a type adapted to have arranged thereon a stocking in stretched condition to conform to the leg and foot sections of the stocking. In the present instance each frame 17 will be made from a single piece of stout wire bent into a leg section 18 and a foot section 19, and a top portion 20. In order to support each of the frames 17 for turning movement, the top portion 20 of each frame is provided with a hook or equivalent means 21, and the top horizontal portion 14 of the casing 10 is provided with a series of eyes or equivalent means 22 for respectively receiving the hooks 21 of the frame 17, as shown most clearly in Fig. 3. The arrangement of the eyes 22 is such that when the frames 17 are suspended therefrom, the frames will bear an overlapping relationship with respect to each other, as shown most clearly in Fig. 4. In order to impart turning movement to the frames 17, simultaneously, and alternately in opposite directions, any preferred type of mechanism may be employed. In the present instance, there is provided an electric motor 23 carried by the rear wall 13 of the casing 10 and through the intervention of a train of gears rotary motion will be transmitted to a crank 24. The crank 24 has a pin 25 disposed in a slot 26 in the lower end of an arm 27 pivotally mounted as at 28. The upper end of the arm 27 carries a connecting element 27 which extends through an arcuate slot 30 in the wall 13 near the top thereof. The element 29 has loosely connected thereto as at 31, a rod 32, whose opposite end is loosely connected as at 33 to a rod 34 supported for compound movement. The compound movement of the rod 34 consists of endwise sliding movement, and lateral sliding movement. This is accomplished by extending the opposite ends of the rod 34 in slots 35 respectively in the side walls 11 near the tops thereof. The portion 20 of each of the frames 17 is provided with a hook 36. The rod 34 is provided with a series of loops 37 equal in number to the number of frames 17. The hooks 36 and loops 37 constitute a means for setting up loose connections between the rod 34 and the frame 17.

From the foregoing it will be understood that when the motor 23 is in operation, motion will be imparted to the rod 34 by virtue of the intervention of the parts between the crank pin 25 and the rod 34, and as a consequence the frames 17 will be turned simultaneously and alternately in opposite directions.

In order that the stockings carried by the frame 17 may be illuminated there are provided electric lamps or equivalent means 38. The said lamps are arranged on the inside of the portion 15. Therefore means is provided for illuminating the stockings so as to give the desired effect at nighttime for displaying the stocking in an attractive manner.

It is to be understood that the invention is not restricted to the precise arrangement of parts shown and described, as details of construction may be modified and rearranged without departing from the spirit of the invention, the scope of which is limited only by the terms of the appended claims.

I claim:

1. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, and means for effecting the continuous turning movement of said frames.

2. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, and means for effecting the continuous turning movement of said frames simultaneously.

3. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, and means for effecting the continuous turning movement of said frames, the frames being suspended so as to bear an overlapping relationship with respect to each other.

4. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, means for effecting the continuous turning movement of said frames, and a lighting means within the casing adapted to illuminate the interior of the casing.

5. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, and means for effecting the continuous turning movement of said frames alternately in opposite directions.

6. A display apparatus comprising a casing having an opening in the front, a plurality of stocking supporting frames arranged in the casing and visible through said opening, each of said frames adapted to hold a stocking shaped to the form of the leg and foot sections thereof, means on which each of said frames is suspended for turning movement on its own axis, and means for effecting the continuous turning movement of said frames simultaneously and alternately in opposite directions.

GENE GARDNER BECKHARDT.